United States Patent [19]

Lustig et al.

[11] Patent Number: 4,865,780
[45] Date of Patent: Sep. 12, 1989

[54] PROCESS FOR PRODUCING IRRADIATED MULTILAYER FILM FOR PRIMAL MEAT PACKAGING

[75] Inventors: Stanley Lustig, Park Forest; Jeffrey M. Schuetz, Woodridge; Stephen J. Vicik, Darien, all of Ill.

[73] Assignee: Viskase Corporation, Chicago, Ill.

[21] Appl. No.: 152,715

[22] Filed: Feb. 5, 1988

Related U.S. Application Data

[60] Division of Ser. No. 42,085, Apr. 24, 1987, Pat. No. 4,737,391, which is a continuation of Ser. No. 677,362, Dec. 3, 1984, abandoned.

[51] Int. Cl.⁴ .............................................. B29C 71/04
[52] U.S. Cl. ..................... 264/22; 264/512; 264/514; 264/524; 264/173; 264/230; 264/567; 264/290.2
[58] Field of Search .................... 264/22, 25, 512–515, 264/524, 545, 240.2, 567, 230

[56] References Cited

U.S. PATENT DOCUMENTS

| 4,044,187 | 8/1977 | Kremkau | 428/212 |
| 4,112,181 | 9/1978 | Baird, Jr. et al. | 428/336 |
| 4,183,882 | 1/1980 | Weinberg et al. | 264/22 |
| 4,225,373 | 9/1980 | Bieler et al. | 264/22 |
| 4,247,584 | 1/1981 | Widiger et al. | 264/290.2 |
| 4,318,763 | 3/1982 | Bieler et al. | 156/198 |
| 4,357,376 | 11/1982 | Nattinger et al. | 428/35 |
| 4,448,792 | 5/1984 | Schirmer | 426/113 |
| 4,501,780 | 2/1985 | Walters et al. | 428/35 |
| 4,541,983 | 9/1985 | Hsu et al. | 264/567 |
| 4,597,920 | 7/1986 | Golike | 264/290.2 |
| 4,699,846 | 10/1987 | Ohya et al. | 264/22 |

FOREIGN PATENT DOCUMENTS

| 982923 | 3/1976 | Canada . | |
| 3342577 | 6/1984 | Fed. Rep. of Germany | 264/22 |
| 57-137117 | 8/1982 | Japan | 264/25 |
| 992897 | 5/1965 | United Kingdom | 264/22 |

Primary Examiner—Jeffery Thurlow
Attorney, Agent, or Firm—John C. LeFever

[57] ABSTRACT

A heat-shrinkable, multilayer film suitable for use in fabricating bags for packaging primal and sub-primal meat cuts and processed meats. The multilayer film has a first outer layer of a first ethylene-vinyl acetate copolymer, a core layer of a barrier film including a polyvinylidene chloride vinylchloride copolymer containing between about 70 weight percent and about 90 weight percent vinylidene chloride, and a second outer layer of a second ethylene-vinyl acetate copolymer. The multilayer film is preferably made by co-extrusion of the layers, and then it is biaxially stretched. After biaxial stretching, the multilayer film is irradiated to a dosage level of between 2 megarads and 3 megarads and heat-sealed in the form of a bag. The bag has improved toughness properties and heat-sealing characteristics and is not significantly discolored by the irradiation.

27 Claims, No Drawings

PROCESS FOR PRODUCING IRRADIATED MULTILAYER FILM FOR PRIMAL MEAT PACKAGING

This application is a division of prior U.S. application Ser. No. 042,085 filing date Apr. 24, 1987 now U.S. Pat. No. 4,737,391 which is a continuation of application Ser. No. 677,362 Filing Date Dec. 3, 1987 now abandoned.

FIELD OF THE INVENTION

This invention relates to an irradiated multilayer film suitable for use in the manufacture of bags for packaging primal and sub-primal meat cuts and processed meats. This invention also relates to such film comprising an irradiated three-layer film wherein the outer layers of the film comprise ethylene-vinyl acetate copolymers, and the core layer comprises copolymers of polyvinylidene chloride or other barrier film, and the process for manufacturing such film.

BACKGROUND OF THE INVENTION

Primal meat cuts, or primals, are large cuts of meat, smaller, for example, than a side of beef, but larger than the ultimate cut that is sold at retail to the consumer. Primal cuts are prepared at the slaughter house and are then shipped to a retail meat store or an institution such as a restaurant where they are butchered into smaller cuts of meat called sub-primal meat cuts or sub-primals. Sub-primals may also be prepared at the slaughter house. When primals and sub-primals are prepared at the slaughter house, they are usually packaged in such a way that air (i.e., oxygen) is prevented from contacting the meat during shipping and handling in order to minimize spoilage and discoloration. One desirable way to package primals and sub-primals so as to protect them from contact with air is to shrink package them with a packaging material that has good oxygen barrier properties. One such shrink packaging material that has good oxygen barrier properties is polyvinylidene chloride film. However, while polyvinylidene chloride per se has excellent oxygen barrier properties, in actual practice, when polyvinylidene chloride is used as a monolayer film, it must be plasticized in order for the film to have adequate abrasion resistance and flexibility at storage temperatures of, for example, 30° to 50° F. Unfortunately, the addition of sufficient plasticizer, such as from 7 to 9 weight percent of the film, to provide the requisite low temperature properties has a significant adverse effect on the oxygen barrier properties of the film. While increasing the thickness of the film from the conventional thickness of 1.5–2.0 mils to, for instance, 5 mils or more, would improve the oxygen barrier properties of the film, it would be economically undesirable to use a monolayer film of polyvinylidene chloride having a thickness of 5 or more mils. Also, if such thick films were employed, bags made from the film would be difficult to gather and clip at the open end.

One approach to the provision of a film for use in shrink packaging primal and sub-primal meat cuts and processed meats having better oxygen barrier properties than the 1.5 to 2.0 mil monolayer polyvinylidene chloride film previously used for that purpose is to employ a multilayer film, one layer of which is polyvinylidene chloride having a minimum amount of plasticizer. The other layer or layers of such a multilayer film are selected so as to provide the requisite low temperature properties and abrasion resistance which are lacking in polyvinylidene chloride film containing little or no plasticizer. In providing such a film, however, it must be recognized that good oxygen barrier properties, abrasion resistance, and low temperature properties are not the only requirements for a film that is to be used for shrink packaging primal meat cuts. The film must have been biaxially stretched in order to produce shrinkage characteristics sufficient to provide that the film will heat shrink within a specified range of percentages, e.g., from about 30 to 60 percent at about 90° C., in both the machine and the transverse directions. The film must be heat sealable in order to be able to fabricate bags from the film and heat seal the open ends of the fabricated bags. The heat sealed seams of the bags must not pull apart during the heat shrinking operation, the film must resist puncturing by sharp edges such as bone edges during the heat shrinking operation, and there must be adequate adhesion between the several layers of the film so that delamination does not occur, either during the heat shrinking operation or during exposure of the film to the relatively high temperatures that may be reached during shipping and storage of the film in the summertime.

It has been proposed to prepare multilayer films, one layer of which is polyvinylidene chloride copolymer and at least one other layer of which is an ethylene-vinyl acetate copolymer. For example, such films are proposed in McFedries, Jr., et al. U.S. Pat. No. 3,600,267, Peterson U.S. Pat. No. 3,524,795, Titchenal et al. U.S. Pat. No. 3,625,348, and Schirmer U.S. Pat. Nos. 3,567,539 and 3,607,505.

Also in the prior art, cross-linking by irradiation has been used to enhance the properties of films employed in packaging operations. For example, U.S. Pat. No. 3,741,253 to Brax et al teaches a multi-ply laminate having a first ply of ethylene-vinyl acetate which is cross-linked by irradiation. The second ply and the third ply of the laminate are not irradiated. The thus-prepared laminate may then be biaxially stretched. Baird et al U.S. Pat. Nos. 3,821,182 and 4,112,181 teach a three-layer film combination which has been irradiated before stretching. In addition, Kremkau U. S. Pat. No. 4,044,187 teaches irradiating a substrate, forming a film laminate therewith, and then irradiating the entire laminate. Further, Bernstein et al U.S. Pat. Nos. 4,391,862 and 4,352,844 disclose co-extruding first and second polymeric layers, irradiating the co-extruded layers, joining a third layer to the second polymeric layer, and then stretching the multilayer film. Still further, Bieler et al U.S. Pat. No. 4,318,763 teaches that multilayer films may be strengthened by cross-linking one of the layers by irradiation after biaxially stretching. However, the prior art does not teach the concept of irradiating all of the layers of a multilayer film only after biaxial stretching of the multilayer film.

The present invention is based upon the discovery that multilayer films, fully described below, having outer layers of ethylene-vinyl acetate copolymers and having a core layer of a barrier film which are irradiated after biaxial stretching to cross-link the ethylene-vinyl acetate layers, can be successfully employed in the shrink packaging of primal and sub-primal meat cuts and processed meats. Accordingly, this invention provides a multilayer film that can be employed to fabricate bags useful for shrink packaging primal and sub-primal meat cuts and processed meats.

SUMMARY OF THE INVENTION

Pursuant to the instant invention, it has been found that a heat-shrinkable multilayer film having outer layers of ethylene-vinyl acetate copolymers and a core layer of a polyvinylidene chloride-vinyl chloride copolymer containing between about 70 weight percent and about 90 weight percent vinylidene chloride as a barrier film, wherein the multilayer film prior to irradiation has been biaxially stretched and then irradiated to a dosage level of between about 2 megard and about 5 megarads, when employed to make bags for packaging primal and sub-primal meat cuts and processed meats, provides bags having improved characteristics, whereby the bags are not significantly discolored by the irradiation and when sealed have the ability to withstand higher sealing temperatures than similar bags wherein the film has not been so irradiated.

DETAILED DESCRIPTION OF THE INVENTION

In accordance with this invention, there is provided a heat shrinkable multilayer film having a first outer layer comprising a first ethylene-vinyl acetate copolymer, said first ethylene-vinyl acetate copolymer having a melt index of from about 0.1 to about 1.0 decigram per minute and a vinyl acetate content of from about 9 to about 15 weight percent, based on the weight of said first ethylene-vinyl acetate copolymer: a core layer comprising a polyvinylidene chloride-vinyl chloride copolymer containing between about 70 weight percent and about 90 weight percent vinylidene chloride as barrier film; and a second outer layer comprising a second ethylene-vinyl acetate copolymer selected from the group consisting of (a) an ethylene-vinyl acetate copolymer having a melt index of from about 0.1 to about 1.0 decigram per minute and a vinyl acetate content of from about 9 to about 18 weight percent, and preferably from about 10 to about 15 weight percent, based on the weight of said second ethylene-vinyl acetate copolymer, and (b) a blend of at least two ethylene-vinyl acetate copolymers, wherein one of said ethylene-vinyl acetate copolymers has a melt index of from about 0.1 to about 1.0 decigram per minute and a vinyl acetate content of from about 10 to 18 weight percent, based on the weight of said copolymer, and the other ethylene-vinyl acetate copolymer has a melt index of from about 0.1 to about 1.0 decigram per minute and a vinyl acetate content of from about 2 to about 10 weight percent, based on the weight of said copolymer. The blend (b) of said at least two ethylene-vinyl acetate copolymers has a vinyl acetate content of from about 9 to about 18 weight percent, and preferably from about 10 to about 15 weight percent, based on the weight of said copolymers. The first ethylene-vinyl acetate copolymer can be a single ethylene-vinyl acetate copolymer or a blend of at least two ethylene-vinyl acetate copolymers having differing melt indices and differing vinyl acetate contents.

The heat shrinkable multilayer film of this invention can be produced by known techniques such as by co-extruding the multiple layers into a primary tube, followed by biaxially stretching the tube by known techniques to form a heat shrinkable film. The "double bubble" technique disclosed in Pahlke U.S. Pat. No. 3,456,044, can be used to produce the tubular film of this invention. Alternatively, the film may be a slot cast co-extruded multilayer film sheet which is biaxially stretched by tentering. After biaxial stretching, the multilayer film is then irradiated to a dosage level of between about 2 megarad and about 3 megarads, such as by passing it through an electron beam irradiation unit. The multilayer film is not significantly discolored by the irradiation and may then be employed to manufacture heat-shrinkable bags useful in packaging primal and sub-primal meat cuts and processed meats.

In accordance with a preferred embodiment of this invention, the first outer layer of the multilayer film is an ethylene-vinyl acetate copolymer containing from about 9 to about 15 weight percent of vinyl acetate, based on the weight of the copolymer, said copolymer having a melt index of between about 0.1 and about 1.0 decigram per minute and may be selected from the group consisting of (a) a single ethylene-vinyl acetate copolymer and (b) a blend of ethylene-vinyl acetate copolymers having differing melt indices and differing vinyl acetate contents.

Further, in a preferred embodiment of this invention the core layer of the multilayer film of this invention has a maximum of 5 weight percent of plasticizer, based upon the weight of the polyvinylidene chloride vinyl chloride copolymer. The polyvinylidene chloride copolymer will contain at least about 70 weight percent, and not more than about 90 weight percent, of polymerized vinylidene chloride because when the polyvinylidene chloride copolymer contains less than about 70 weight percent vinylidene chloride the oxygen barrier property of the copolymer is not satisfactory. If the vinylidene chloride content is more than 90 weight percent, the polyvinylidene chloride copolymer is generally not extrudable. The polyvinylidene chloride copolymer preferably contains less than 5 weight percent plasticizer, and more preferably less than 4 weight percent plasticizer, the percentages being based on the weight of the copolymer, in order to maximize the barrier properties of the thin film. Conventional plasticizers such as dibutyl sebacate and epoxidized soybean oil can be used.

The second outer layer of the multilayer film of this invention comprises an ethylene-vinyl acetate copolymer selected from the group consisting of (a) an ethylene-vinyl acetate copolymer having a melt index of from about 0.1 to about 1.0 decigram per minute and a vinyl acetate content of from about 9 to about 18 weight percent, and preferably from about 10 to about 15 weight percent, based on the weight of said second ethylene-vinyl acetate copolymer, and (b) a blend of at least two ethylene-vinyl acetate copolymers, wherein one of said ethylene-vinyl acetate copolymers has a melt index of from about 0.1 to about 1.0 decigram per minute and a vinyl acetate content of from about 10 to about 18 weight percent, based on the weight of said copolymer, and the other ethylene-vinyl acetate copolymer has a melt index of from about 0.1 to about 1.0 decigram per minute and a vinyl acetate content of from about 2 to about 10 weight percent, based on the weight of said copolymer. The blend (b) of said at least two ethylene-vinyl acetate copolymers has a vinyl acetate content of from about 9 to about 18 weight percent, and preferably from about 10 to about 15 weight percent, based on the weight of said copolymers.

The multilayer film of this invention will generally have a total thickness of from about 1.75 mils to about 3.0 mils, preferably of from about 2.0 mils to about 3.0 mils because when the thickness of the multilayer film is more than 3.0 mils, clipping problems are encountered in that it is difficult to gather together the open end of a bag made therefrom. When the thickness of the multilayer film is less than 1.75 mils, the bag will have diminished puncture resistance. The first outer layer will normally have a thickness of from about 1.1 mils to about 1.6 mils; the core layer will normally have a thickness of from about 0.25 mil to about 0.45 mil; and the second outer layer will normally have a thickness of from about 0.4 mil to about 1.0 mil.

After biaxial stretching by any suitable method well known in the art, the multilayer film of this invention is irradiated to a dosage level of between about 2 megarads and about 3 megarads, by a suitable method such as employing an electron beam. It has been found pursuant to this invention that the irradiation energy applied to the multilayer film herein is important. That is, when the energy level is below the indicated range, sufficient cross-linking is not obtained so as to improve the heat sealing characteristics of the multilayer film or to have any enhanced effect upon the toughness properties of the film. When the energy level is above the afore-mentioned range, film discoloration occurs due to degradation of the polyvinylidene chloride copolymer core layer, the degree of the film shrinkage is significantly reduced, and further improvements in the heat sealing characteristics and toughness properties of the film are not achieved.

In another aspect of this invention, bags suitable for the shrink packaging of primal and sub-primal meat cuts and processed meats are provided from the afore-described multilayer film. The bags may be produced from the multilayer film of this invention by any suitable method, such as by heat sealing. For instance, if the film of this invention is produced in the form of tubular film, bags can be produced therefrom by heat sealing one end of a length of the tubular film or by sealing both ends of the tube end then slitting one edge to form the bag mouth. If the film of this invention is made in the form of flat sheets, bags can be formed therefrom by heat sealing three edges of two superimposed sheets of film. When carrying out the heat sealing operation, the surfaces which are heat sealed to each other to form seams are the said first outer layers of the films of the invention. Thus, for example, when forming a bag by heat sealing one edge of a length of tubular film, the inner surface of the tube, i.e., the surface which will be heat sealed to itself, will be the said first outer layer of the film.

The invention is further illustrated by the Examples which appear below.

In the Examples, the following materials were employed:

Ethylene-Vinyl Acetate ("EVA") Copolymers

EVA Copolymer U—12 weight percent vinyl acetate, 0.25 melt index.
EVA Copolymer F—15 weight percent vinyl acetate, 0.5 melt index.
EVA Copolymer R—12 weight percent vinyl acetate, 0.5 melt index.
EVA Copolymer G—A blend of (a) 75 weight percent EVA having 12 weight percent vinyl acetate and 0.35 melt index, and (b) 25 weight percent EVA having 4.5 weight percent vinyl acetate and 0.25 melt index.

Polyvinylidene Chloride Polymer ("PVDC")

PVDC Copolymer D—84 to 87 weight percent vinylidene chloride, with 13 to 16 weight percent vinyl chloride, reduced viscosity in cyclohexanone at 30° C. of 0.055–0.059.
PVDC Copolymer K—71 weight percent vinylidene chloride, with 29 weight percent vinyl chloride.

The following test methods were used in determining the properties of the resins and films used in the examples. Melt index values were obtained pursuant to ASTM Method D-1238, condition E. Decalin extraction was obtained by ASTM Method D-2765, condition A. Tensile strength values were obtained following ASTM Method D-882, procedure A.

Non-ASTM test methods employed are described in the following discussion. Shrinkage values were obtained by measuring unrestrained shrink at 90° C. for five seconds.

The dynamic puncture-impact test procedure is used to compare films for their resistance to bone puncture. It measures the energy required to puncture a test sample with a sharp triangular metal point made to simulate a sharp bone end. A Dynamic Ball Burst Tester, Model No. 13-8, available from Testing Machines, Inc., Amityville, Long Island, New York, wherein a ⅜ inch diameter triangular tip, as aforedescribed, is installed on the tester probe arm and employed in this test procedure. Six test specimens approximately 4 inches square are prepared, a sample is placed in the sample holder, and the pendulum is released. The energy required to puncture the test sample is recorded. The test is repeated until 6 samples have been evaluated and the test results are averaged. The results are calculated in cm-kg per mil of film thickness.

The hot water puncture test is performed as follows. Water is heated to 90°±1° C. A ⅜ inch round wooden dowel is sharpened on one end to a point about 1/16 inch round and is fastened to a wooden block so that the sharpened point projects 1½ inches beyond the end of the wooden block. A sample about 3 inches wide in the transverse direction and about ten inches long is cut from the test material. One end of the sample is placed on the end of the wooden block opposite the pointed dowel. The sample is wrapped around the end of the sharpened dowel and back to the wooden block on the opposite side. The film thickness in the area of contact with the sharpened dowel is measured. The sample and pointed dowel are quickly immersed into the heated water and a timer is started. The timer is stopped when the wooden dowel point punctures the film sample. The test is repeated four times with four film samples from a given test material. The time required for penetration is recorded and then averaged.

The puncture propagation of tear test is run to measure the ability of a plastic film to resist puncture and the propagation of that puncture. The test apparatus comprises Puncture Propagation Tear Tester Model No. 83-5 available from Testing Machines, Inc., Amityville, Long Island, N.Y. Six test specimens are prepared for machine direction determinations. The specimens are cut to a size of 10 inches in the machine direction by 8 inches in the transverse direction. The specimen is secured in the holder. The carriage is placed in the release mechanism and released. The tear length is read to the nearest 0.05 cm. The test results from the six specimens are averaged.

The impulse sealing range test is run to determine the acceptable voltage range for sealing a plastic film. A Sentinel Model 12-12AS laboratory sealer manufactured by Packaging Industries Group, Inc., Hyannis, Mass. was used. Sealing conditions of 1.0 second impulse time, 1.3 seconds cooling time and 50 psi jaw pressure were used. The minimum voltage was determined as that voltage which was capable of sealing four pieces of film together simulating a fold commonly encountered in field testing. The maximum sealing voltage was determined as the voltage at which seal "burn-thru" begins to occur. "Burn-thru" is defined as holes or tears in the seal caused by the high temperature and pressure of the sealing ribbon. This has a detrimental effect on seal strength and integrity as well as final package appearance.

EXAMPLE I

Biaxially stretched three-layer films were produced by the "double-bubble" process disclosed in U.S. Pat. No. 3,456,044 by co-extruding the following materials through a multilayer die, biaxially stretching the co-extruded primary tube, and then irradiating the biaxially stretched tube. The film comprised the following materials.

Second outer Layer—EVA Copolymer F
Core Layer—PVDC Copolymer K
First Outer Layer—EVA Copolymer U The resulting biaxially stretched film thickness averaged 2.5 mils and resulted in a satisfactory percent free shrinkage of 44% MD and 50% TD.

Irradiation of the test films was carried out by passing portions of the biaxially stretched multilayer film through the electron curtain of an irradiation unit and immediately rewinding the web. Experiments were conducted by irradiating the films at various dosage levels between 0.5 and 5.0 megarads.

Results of impulse sealing studies on these films are outlined in Table 1. The data indicate that irradiation doses as low as 0.5 megarad begin to broaden the impulse sealing range. Irradiation doses of 2 to 3 megarads show a dramatic increase in the upper voltage limit without significantly discoloring the film due to PVDC degradation. At 4 and 5 megarad doses, further increases in the upper impulse sealing voltage were not observed, and unacceptable film discoloration occurred. Also, at the 5 megarad dose, the minimum sealing voltage was raised by 2 volts, narrowing the acceptable sealing range.

TABLE 1

| SEALING PERFORMANCE OF IRRADIATED FILMS | | |
|---|---|---|
| TEST FILM | IRRADIATION LEVEL (Mrad) | SEALING VOLTAGE RANGE (V) |
| 6 | 3.0 | 18–31 |
| 7 | 4.0 | 18–31 |
| 8 | 5.0 | 20–32 |

EXAMPLE II

Biaxially stretched three-layer films were produced by the "double bubble" process disclosed in U. S. Pat. No. 3,456,044 by co-extrusion of the following materials through a multilayer die, subsequent biaxial stretching of the primary tube, and then by irradiation of the biaxially stretched tube. The multilayer film comprised the following materials:

First Outer Layer—EVA Copolymer U
Core Layer—PVDC Copolymer D
Second Outer Layer—EVA Copolymer F The resulting stretched multilayer film had an average thickness of 2.5 mils.

The film biaxially stretched well and resulted in satisfactory percent free shrinkage of 45% MD and 46% TD. The biaxially stretched film was irradiated at 0.5, 1.0, 2.0, 3.0, 4.0, and 5.0 Megarad doses. Irradiation of the test films was carried out by passing portions of the biaxially stretched multilayer film through the electron curtain of the irradiation unit and immediately rewinding the web.

Industrial field tests were conducted on bottom sealed bags made from a non-irradiated control sample, 2 and 4 megarad irradiated samples. Sub-primal red meat cuts were packaged using a commercial 8300-18 rotary evacuator-sealer available from the Cryovac Division of W. R. Grace and Company. Both the 2 and 4 megarad samples did not suffer seal burn-thru during the test. The non-irradiated control film produced 65% burned-thru seals due to the high impulse sealing voltage on the 8300-18 evacuator.

The aforedescribed irradiated films were evaluated for physical properties. The results of these evaluations, along with those for a non-irradiated control, are summarized in Table 2.

TABLE 2

| SAMPLE | PHYSICAL PROPERTIES OF IRRADIATED FILMS | | | | | | |
|---|---|---|---|---|---|---|---|
| | CONTROL | 0.5 Mrad | 1.0 Mrad | 2.0 Mrad | 3.0 Mrad | 4.0 Mrad | 5.0 Mrad |
| GAUGE, mil, avg | 2.5 | 2.6 | 2.6 | 2.6 | 2.6 | 2.6 | 2.6 |
| TENSILE STRENGTH, psi MD/TD* | 8800/8200 | 8400/8600 | 9700/9100 | 9000/8800 | 9900/9400 | 10,100/9700 | 9700/9300 |
| SHRINKAGE, @ 90° C., % MD/TD | 45/46 | 42/45 | 44/45 | 42/45 | 43/44 | 40/42 | 42/44 |
| DYNAMIC PUNCTURE, cm-kg/mil | 1.3 | 1.3 | 1.4 | 1.5 | 1.8 | 1.8 | 1.7 |
| HOT WATER PUNCTURE 90° C., sec. | 18 | 46 | 107+ | 120+ | 120+ | 120+ | 120+ |
| PUNCTURE PROPAGATION TEAR LENGTH, cm | 4.4 | 4.6 | 4.0 | 3.8 | 3.7 | 3.6 | 4.2 |
| COLOR | Acceptable | Acceptable | Acceptable | Acceptable | Acceptable | Unacceptable | Unacceptable |

*MD/TD stands for machine direction/transverse direction.

| SEALING PERFORMANCE OF IRRADIATED FILMS | | |
|---|---|---|
| TEST FILM | IRRADIATION LEVEL (Mrad) | SEALING VOLTAGE RANGE (V) |
| Control | 0 | 18–21 |
| 1 | 0.5 | 18–22 |
| 2 | 1.0 | 18–24 |
| 3 | 1.5 | 18–26 |
| 4 | 2.0 | 18–27 |
| 5 | 2.5 | 18–29 |

From Table 2, it can be seen that the tensile strength of the film gradually increases as the irradiation dosage level is increased from 1.0 megarad to about 4.0 megarads, and begins decreasing at the 5.0 megarad dosage level. A slight loss in film shrinkage properties results at all irradiation dosage levels between 0.5 and 5.0 megarads. The puncture strength of the film improved at both dynamic and hot water conditions with irradiation dosage levels of between 0.5 and 5.0 megarads. More particularly, dynamic puncture values increased at the 1.0 megarad dosage level and at higher dosage levels, with an increase of about 40% at the 3.0 and 4.0 megarad dosage levels. Hot water puncture values progressively increased at all irradiation dosage levels, and at 2.0 to 5.0 megarads all film samples survived the maximum exposure time of two minutes (120 seconds). The tear strength of the irradiated films, as evidenced by the puncture propagation tear length values, was improved when treated at between 1.D megarad and 5.0 megarads, and more significantly improved when treated at between 2.0 megarads and 4.0 megarads.

Portions of the three multilayer films were not irradiated and were used as control samples. Other portions of the three multilayer films were irradiated at dosage levels of 2.0 and 3.0 megarads as described in Example I and then evaluated for physical properties. The results of these evaluations are summarized in Tables 3, 4 and 5.

TABLE 3

PHYSICAL PROPERTIES OF IRRADIATED FILM 1

| Sample | Control | Irradiated | Irradiated |
|---|---|---|---|
| Irradiation Dose, megarads | 0 | 2 | 3 |
| Gauge, mil | 2.5 | 2.5 | 2.5 |
| Shrinkage 90° C., % MD/TD | 41/46 | 41/45 | 43/44 |
| Tensile Strength, psi MD/TD | 8800/9800 | 8800/9400 | 9000/10,100 |
| Dynamic Puncture, cm-kg/mil | 1.4 | 1.9 | 2.0 |
| Hot Water Puncture 90° C., Sec. | 17 | 63 | 120+ |
| Color | Acceptable | Acceptable | Acceptable |
| Sealing Range, V | 18–21 | 18–27 | 18–31 |

TABLE 4

PHYSICAL PROPERTIES OF IRRADIATED FILM 2

| Sample | Control | Irradiated | Irradiated |
|---|---|---|---|
| Irradiation Dose, megarads | 0 | 2 | 3 |
| Gauge, mil | 2.5 | 2.5 | 2.5 |
| Shrinkage 90° C., % MD/TD | 34/46 | 34/44 | 36/44 |
| Tensile Strength, psi MD/TD | 8600/10,500 | 8400/11,000 | 9500/11,200 |
| Dynamic Puncture, cm-kg/mil | 1.5 | 1.9 | 1.7 |
| Hot Water Puncture 90° C., Sec. | 6 | 27 | 41 |
| Color | Acceptable | Acceptable | Acceptable |
| Sealing Range, V | 18–24 | 18–28 | 18–29 |

TABLE 5

PHYSICAL PROPERTIES OF IRRADIATED FILM 3

| Sample | Control | Irradiated | Irradiated |
|---|---|---|---|
| Irradiation Dose, megarads | 0 | 2 | 3 |
| Gauge, mil | 2.5 | 2.5 | 2.5 |
| Shrinkage 90° C., % MD/TD | 45/47 | 43/46 | 43/45 |
| Tensile Strength, psi MD/TD | 8100/7000 | 9800/8800 | 9500/10,800 |
| Dynamic Puncture, cm-kg/mil | 1.4 | 1.4 | 1.8 |
| Hot Water Puncture 90° C., Sec. | 13 | 62 | 120+ |
| Color | Acceptable | Acceptable | Acceptable |
| Sealing Range, V | 18–23 | 18–29 | 18–31 |

EXAMPLE III

Three multilayer film compositions were prepared by the "double bubble" process disclosed in U.S. Pat. No. 3,456,044 by co-extrusion of the compositions through a multilayer die, and by subsequent biaxial stretching. After biaxial stretching, the multilayer film compositions were irradiated to effect cross-linking.

Film 1 comprised a second outer layer made with EVA Copolymer F, a core layer made with PVDC Copolymer K, and a first outer layer made with EVA Copolymer U.

Film 2 comprised a second outer layer made with EVA Copolymer G, a core layer made with PVDC Copolymer D, and a first outer layer made with EVA Copolymer U.

Film 3 comprised a second outer layer made with EVA Copolymer R, a core layer made with PVDC Copolymer K, and a first outer layer made with EVA Copolymer U.

It can be seen from the data given in Tables 3, 4, and 5 that the impulse sealing range was dramatically increased at the 2 and 3 megarad irradiation doses. Film color change due to PVDC degradation was minimal in all of the irradiated samples, making the irradiated films still acceptable for use in the red meat and processed meat industry. The tensile strengths of the films irradiated with 2 megarads improved an average of 7% compared to the controls, while the tensile strengths of the films irradiated with 3 megarads improved an average of 14%. The dynamic puncture strength values of the irradiated films increased an average of about 20% at the 2 megarad dosage level and an average of about 30% at the 3 megarad dosage level. The hot water puncture strengths were also increased dramatically. Survival times for the films irradiated with 2 megarads were increased by at least 200%, and a 600% increase was observed at the 3 megarad dosage level.

In summary, the novel film compositions of this invention have been shown to possess improved physical properties for use as bags in packaging primal meat cuts, wherein the bags provide the desired heat-shrinking and heat-sealing characteristics in such operations.

Although preferred embodiments of this invention have been described in detail, it is contemplated that modifications thereof may be made and some preferred features may be employed without others, all within the spirit and scope of the broad invention. Additionally, although three-layer films are illustrated in the examples, multilayer films having more than three layers are contemplated within the scope of this invention provided that at least one of the plurality of core layers comprises a polyvinylidene chloride-vinyl copolymer barrier film as previously described.

What is claimed is:

1. A process for producing a multilayer film suitable for packaging primal and sub-primal meat cuts and processed meats comprising:
   (a) co-extruding a multilayer film first outer film layer comprising a first ethylene-vinyl acetate copolymer, a core film layer comprising polyvinylidene chloride-vinyl chloride copolymer containing between about 70 weight percent and about 90 weight percent vinylidene chloride as a barrier, and a second outer film layer comprising a second ethylene-vinyl acetate copolymer;
   (b) biaxially stretching said multilayer film; and
   (c) substantially uniformly irradiating the entire multilayer film to a dosage level of between about 2 megarads and about 3 megarads, whereby said multilayer film is not significantly discolored by the irradiation and is able to withstand higher sealing temperatures than a similar film which has not been so irradiated.

2. A process in accordance with claim 1 wherein said first ethylene-vinyl acetate copolymer has a melt index of from about 0.1 to about 1.0 decigram per minute and a vinyl acetate content of from about 9 to about 15 weight percent, based on the weight of said first ethylene-vinyl acetate copolymer.

3. A process in accordance with claim 1 wherein said first ethylene-vinyl acetate copolymer is selected from the group consisting of (a) a single ethylene-vinyl acetate copolymer, and (b) a blend of ethylene-vinyl acetate copolymers having differing melt indices and differing vinyl acetate contents.

4. A process in accordance with claim 1 wherein said polyvinylidene chloride copolymer contains a maximum of 5 weight percent plasticizer, based on the weight of said polyvinylidene chloride copolymer.

5. A process in accordance with claim 1 wherein said second outer layer comprises a second ethylene-vinyl acetate copolymer having a melt index of from about 0.1 to about 1.0 decigram per minute and a vinyl acetate content of from about 9 to about 18 weight percent, based on the weight of said second ethylene-vinyl acetate copolymer.

6. A process in accordance with claim 1 wherein said second layer comprises a second ethylene-vinyl acetate copolymer having a vinyl acetate content of from about 10 to about 15 weight percent, based on the weight of said copolymer.

7. A process in accordance with claim 1 wherein said second ethylene-vinyl acetate copolymer comprises a blend of at least two ethylene-vinyl acetate copolymers, wherein one of said ethylene-vinyl acetate copolymers has a melt index of from about 0.1 to about 1.0 decigram per minute and a vinyl acetate content of from about 10 to about 18 weight percent, based on the weight of said copolymer, and one of said ethylene-vinyl acetate copolymers has a melt index of from about 0.1 to about 1.0 decigram per minute and a vinyl acetate content of from about 2 to about 10 weight percent, based on the weight of said copolymer.

8. A process in accordance with claim 7 wherein said blend of said second ethylene-vinyl acetate copolymers has a vinyl acetate content of from about 9 to about 18 weight percent, based on the weight of said blend of ethylene-vinyl acetate copolymers.

9. A process in accordance with claim 1 wherein said first outer layer has a thickness from about 1.1 mils to about 1.6 mils.

10. A process in accordance with claim 1 wherein said first core layer has a thickness of from about 0.25 mil to about 0.45 mil.

11. A process in accordance with claim 1 wherein said second outer layer has a thickness of from about 0.4 mil to about 1.0 mil.

12. A process in accordance with claim 1 wherein said multilayer film has a total thickness of from about 1.75 mils to about 3.0 mils.

13. A process in accordance with claim 1 including fabricating said multilayer film into the form of a bag.

14. A process in accordance with claim 1 wherein said co-extrusion of said film layers produces a multilayer film sheet.

15. A process in accordance with claim 1 wherein said co-extrusion of said film layers produces a multilayer tubular film.

16. A process for producing a multilayer film suitable for packaging primal and sub-primal meat cuts and processed meats comprising:
   (a) co-extruding a first outer film layer comprising a first ethylene-vinyl acetate copolymer having a melt index of from about 0.1 to about 1.0 decigram per minute and a vinyl acetate content of from about 9 to about 15 weight percent, based on the weight of said first ethylene-vinyl acetate copolymer, said first ethylene-vinyl acetate copolymer being selected from the group consisting of (a) a single ethylene-vinyl acetate copolymer, and (b) a blend of ethylene-vinyl acetate copolymers having differing melt indices and differing vinyl acetate contents; a core film layer comprising polyvinylidene chloride-vinyl chloride copolymer containing between about 70 weight percent and about 90 weight percent vinylidene chloride; and a second outer film layer comprising a second ethylene-vinyl acetate copolymer selected from the group consisting of (a) an ethylene-vinyl acetate copolymer having a melt index of from about 0.1 to about 1.0 decigram per minute and a vinyl acetate content of from about 9 to about 18 weight percent, based on the weight of said second ethylene-vinyl acetate copolymer, and (b) a blend of at least two ethylene-vinyl acetate copolymers, wherein one of said ethylene-vinyl acetate copolymers has a melt index of from about 0.1 to about 1.0 decigram per minute and a vinyl acetate content of from about 10 to about 18 weight percent, based on the weight of said copolymer, and the other ethylene-vinyl acetate copolymer has a melt index of from about 0.1 to about 1.0 decigram per minute and a vinyl acetate content of from about 2 to about 10 weight percent, based on the weight of said copolymer;
   (b) biaxially stretching said multilayer film; and
   (c) substantially uniformly irradiating the entire multilayer film to a dosage level of between about 2 megarads and about 3 megarads, whereby said multilayer film is not significantly discolored by the irradiation and is able to withstand higher sealing temperatures than a similar film which has not been so irradiated.

17. A process in accordance with claim 16 wherein said polyvinylidene chloride copolymer contains a maximum of 5 weight percent plasticizer, based on the weight of said polyvinylidene chloride copolymer.

18. A process in accordance with claim 16 wherein said second outer layer comprises a second ethylene-vinyl acetate copolymer having a vinyl acetate content of from about 10 to about 15 weight percent, based on the weight of said copolymer.

19. A process in accordance with claim 16 wherein said blend of said second ethylene-vinyl acetate copolymers has a vinyl acetate content of from about 9 to about 18 weight percent, based on the weight of said blend of ethylene-vinyl acetate copolymers.

20. A process in accordance with claim 16 wherein said first outer layer has a thickness from about 1.1 mils to about 1.6 mils.

21. A process in accordance with claim 16 wherein said core layer has a thickness of from about 0.25 mil to about 0.45 mil.

22. A process in accordance with claim 16 wherein said second outer layer has a thickness of from about 0.4 mill to about 1.0 mil.

23. A process in accordance with claim 16 wherein said multilayer film has a total thickness of from about 1.75 mils to about 3.0 mils.

24. A process in accordance with claim 16 including fabricating said multilayer film into the form of a bag.

25. A process in accordance with claim 16 wherein said co-extrusion of said film layers produces a multilayer film sheet.

26. A process in accordance with claim 16 wherein said co-extrusion of said film layers produces a multilayer tubular film.

27. A process for producing a multilayer film suitable for packaging primal and sub-primal meat cuts and processed meats comprising:
(a) co-extruding a multilayer film first outer layer film layer, a core film layer comprising polyvinylidene chloride-vinyl chloride copolymer containing between about 70 weight percent and about 90 weight percent vinylidene chloride as a barrier, and a second outer film layer;
(b) biaxially stretching said multilayer film; and
(c) substantially uniformly irradiating the entire multilayer film to a dosage level of between about 2 megarads and about 3 megarads, whereby said multilayer film is not significantly discolored by the irradiation and is able to withstand higher sealing temperatures than a similar film which has not been so irradiated.

* * * * *